(12) United States Patent
Rubin

(10) Patent No.: US 8,768,869 B1
(45) Date of Patent: Jul. 1, 2014

(54) BRIAN: A BASIC REGIMEN FOR INTELLIGENT ANALYSIS USING NETWORKS

(75) Inventor: Stuart Harvey Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 279 days.

(21) Appl. No.: 13/451,348

(22) Filed: Apr. 19, 2012

(51) Int. Cl.
*G06F 17/00* (2006.01)
(52) U.S. Cl.
USPC .......................................................... 706/12
(58) Field of Classification Search
CPC ........... G06N 5/02; G06N 5/04; G06N 5/025; G06N 99/005
USPC .......................................................... 706/12
See application file for complete search history.

(56) References Cited

U.S. PATENT DOCUMENTS

| 7,047,226 | B2 | 5/2006 | Rubin |
| 8,073,804 | B1 | 12/2011 | Rubin |
| 8,117,147 | B1 | 2/2012 | Rubin |

OTHER PUBLICATIONS

Armella et al., Knowledge acquisition from corresponding domain knowledge transformations, IEEE International Conference on Information Reuse & Integration, 175-181 (2009).*
Rubin, A learning-by-metaphor human-machine system, IEEE International Conference on Systems, Man, and Cybernetics, 4439-4444 (2006).*
Rubin et al., KASER: A qualitatively fuzzy object-oriented inference engine, Proc. North American Fuzzy Information Soc., 354-359 (2002).*
Rubin et al., T2K2: A Type II KASER, IEEE International Conference on Information Reuse & Integration, 147-153 (2006).*
Rubin, Lee, Pedrycz, and Chen; Modeling Human Cognition Using a Transformational Knowledge Architecture; IEEE 978-1-4244-2173-2/08; 2008.
Rubin, Rush, and Ceruti; Application of Object-Oriented Design to Knowledge Amplification by Structured Expert Randomization (KASER); IEEE Proceedings of the Seventh International Workshop on Object-Oriented Real-Time Dependable Systems (WORDS 2002); 2002.
Rubin; A System of Systems (SoS) Design Amplifier; IEEE Proceedings of the Fourth International conference on Machine Learning and Applications (ICMLA'05); 2005.

(Continued)

*Primary Examiner* — Kakali Chaki
*Assistant Examiner* — Michael Zidanic
(74) *Attorney, Agent, or Firm* — SPAWAR Systems Center Pacific; Kyle Eppele; J. Eric Anderson

(57) ABSTRACT

A method for machine-learning by analogy, comprising: providing a network of component computer systems, each component having sequential layers, each layer having parallel segments, each segment comprises a processor and a memory store, each memory store is configured to store a domain-specific case base, which is defined by a situation-action pair; stochastically transforming cases in each case base through automatic deterministic generalization and analogy when the corresponding processor is in a dream mode to create transformed cases; providing a user-entered situation; modifying the user-entered situation by expanding its contextual mnemonics; searching each case base for cases and transformed cases that include contextual subsets of the modified, user-entered situation; for a given case base, mapping the modified, user-entered situation to a matched action within the given case base; creating a new case comprising the user-entered situation and the matched action.

4 Claims, 9 Drawing Sheets

(56) References Cited

OTHER PUBLICATIONS

Rubin, S., et al., "Learning Using an Information Fusion Approach", Proc. of the ISCA Int'l Conference on Intelligent and Adaptive Systems, Nice, 2004.

Chaitin, G.J., "Randomness and Mathematical Proof", Sci. Amer., vol. 232, No. 5, pp. 47-52, 1975.

Zadeh, L.A., "From Computing with Numbers to Computing with Words . . . ," IEEE Trans. Ckt. and Systems, vol. 46, No. 1, pp. 105-119, 1999.

Rubin, S, H., et al., "On the Role of Informed Search in Veristic Computing", Proc. 2001 IEEE Int. Conf. Syst., Man, Cybern., pp. 2301-2308, 2001.

Rubin, S H., et al., "KASER: Knowledge Amplfcation by Structured Expert Randomization", IEEE Trans. Syst., Man, Cybern,: Part B, vol. 34, No. 6m Dec. 2004, pp. 2317-2329.

Rubin, S.H., "On randomization and discovery", Information Sciences, vol. 177, pp. 170-191, Jan. 2007.

Solomonoff, "A Formal Theory of Inductive Inference", Information and Control, vol. 7, pp. 1-22, 224-254, 1964.

Godel, "On formally undecidable propositions of Principia Mathematica and related systems I", 1931.

Barker et al., "A Knowledge Acquisition Tool for Course of Action Analysis", American Association for Artificial Intelligence, 2003.

Rubin, S.H., "System and Method for Manipulating Database Search Results", Unpublished U.S. Appl. No. 12/552,506, filed Sep. 2, 2009.

Rubin, S.H., "Type 5 Knowledge Amplification by Structured Expert Randomization (KASER)", Unpublished U.S. Appl. No. 12/652,215, filed Jan. 5, 2010.

Rubin, S.H., "Type 6 KASER (Knowledge Amplification by Structured Expert Randomization) for Providing Case-based Inductive and Analogical Reasoning", Unpublished U.S. Appl. No. 12/683,655, filed Jan. 7, 2010.

\* cited by examiner

26 — Provide a network of component computer systems, each component comprising a plurality of sequential layers, each layer comprising a plurality of parallel segments, each segment comprising a processor and a memory store, each memory store being configured to store a domain-specific case base, and each case is defined by a situation-action pair.

28 — Stochastically transform cases in each case base through automatic deterministic generalization and analogy when the corresponding processor is in a dream mode to create transformed cases.

30 — Provide a user-entered situation.

32 — Modify the user-entered situation by expanding its contextual mnemonics.

34 — Search each case base for cases and transformed cases that include contextual subsets of the modified, user-entered situation.

36 — For a given case base, map the modified, user-entered situation to a matched action within the given case base.

38 — Create a new case comprising the user-entered situation and the matched action.

BRIAN: A BASIC REGIMEN FOR INTELLIGENT ANALYSIS USING NETWORKS

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 100970.

BACKGROUND OF THE INVENTION

Human-level intelligence for decision making is not unique. Rather, it evolved from the simplest environmental constraints (e.g., a crossing of cerebral hemispheres in fish to avoid swimming into objects) in the form of situation→action pairs to more-complex constraints in apes (e.g., yellow color in tree likely to be bananas) to the most-complex constraints in humans—still having fundamental origins with transfer learning by analogy to modern tasks. Fast-forwarding to modern intelligent systems presents the need, among many others, to solve a fundamental outstanding problem in case-based-reasoning (CBR); namely, indexing and adaptively generalizing case-based solutions.

SUMMARY

Disclosed herein is a method for machine-learning by analogy. The first step of the method entails providing a network of component computer systems. Each component comprises a plurality of sequential layers. Each layer comprises a plurality of parallel segments. Each segment comprises a processor and a memory store. Each memory store is configured to store a domain-specific case base. Each case is defined by a situation-action pair. The next step provides for stochastically transforming cases in each case base through automatic deterministic generalization and analogy when the corresponding processor is in a dream mode to create transformed cases. Then, a user provides a situation. The next step provides for modifying the user-entered situation by expanding its contextual mnemonics. The next step provides for searching each case base for cases and transformed cases that include contextual subsets of the modified, user-entered situation. For a given case base, the modified, user-entered situation is then mapped to a matched action within the given case base. Then, a new case is created comprising the user-entered situation and the matched action.

BRIEF DESCRIPTION OF THE DRAWINGS

Throughout the several views, like elements are referenced using like references. The elements in the figures are not drawn to scale and some dimensions are exaggerated for clarity.

FIG. 2 is a flowchart of a basic regimen for intelligent analysis using networks.

DETAILED DESCRIPTION OF EMBODIMENTS

Figure 1:
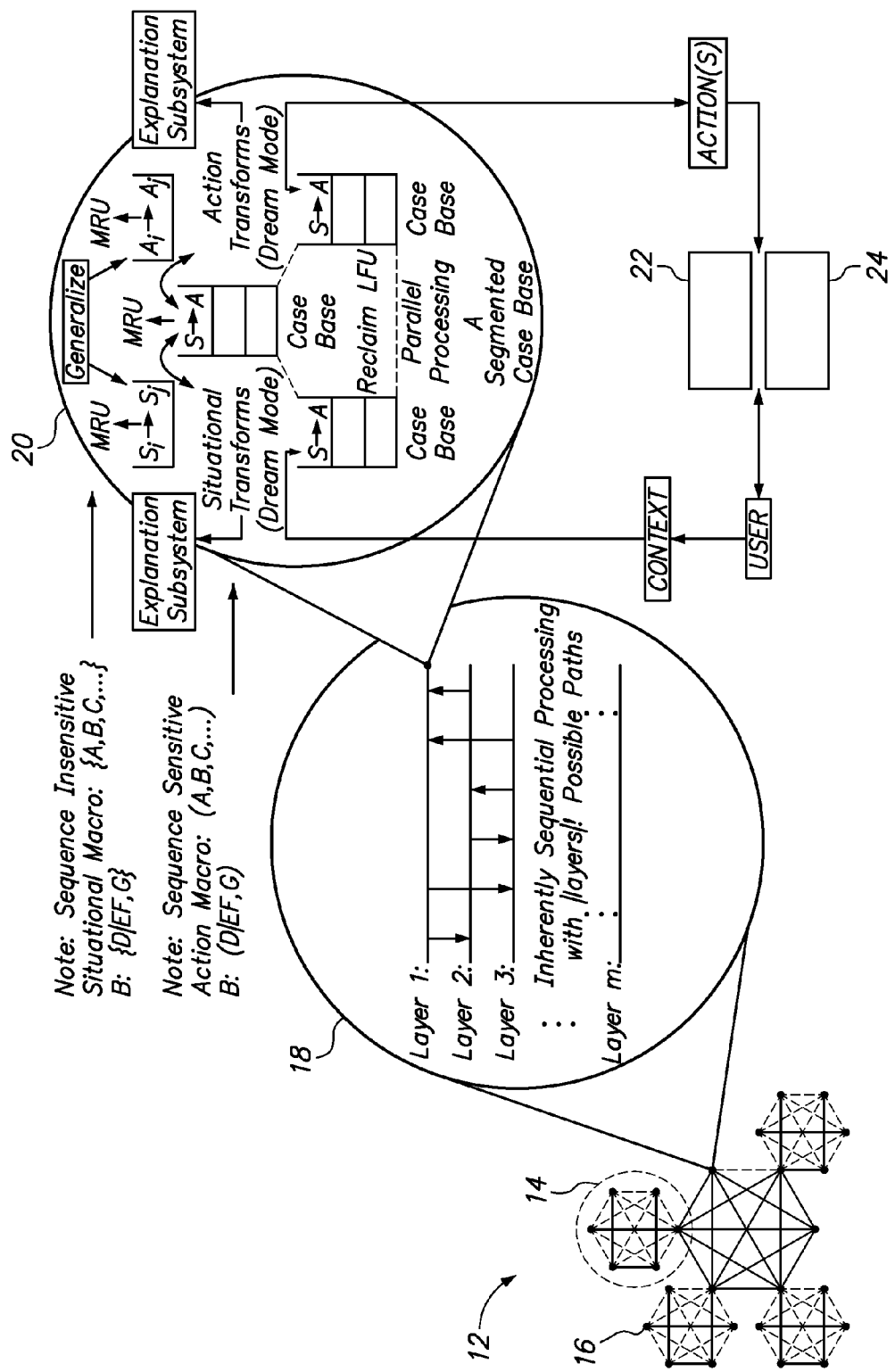
FIG. 1 is an architectural overview of a basic regimen for intelligent analysis using networks.

FIG. 1 is an architectural overview of a basic regimen for intelligent analysis using networks (hereinafter referred to as BRIAN method 10), which is a method for creative machine learning by analogy. BRIAN method 10 utilizes a network 12 of component computer systems 14. Each component system 14 comprises a plurality of components 16. Each component 16 comprises a plurality of sequential layers 18. Each layer 18 comprises a plurality of parallel segments 20. Each segment 20 comprises a processor and a memory store (not shown). Each memory store in each segment 20 is configured to store a domain-specific case base. Each case is defined by a situation-action pair S→A. A situation, which may also be referred to herein as a context and/or a left-hand-side, may be defined as a set of parametized natural language questions. An action, which may also be referred to herein as a right-hand-side, may be defined as a sequence of parametized natural language statements. FIG. 1 also shows an optional companion system pre-processor 22 for Wernicke correction, as well as a companion system post-processor 24 for Broca correction, both of which will be described in more detail hereafter.

FIG. 2 is a flowchart of BRIAN method 10. The first step 26 of BRIAN method 10 comprises providing a network 12 of component computer systems 14. The second step 28 provides for stochastically transforming cases in each case base through automatic deterministic generalization and analogy when the corresponding processor is in a dream mode to create transformed cases. The third step 30 entails providing a user-entered situation. Next the fourth step 32 provides for modifying the user-entered situation by expanding its contextual mnemonics. The fifth step 34 provides for searching each case base for cases and transformed cases that include contextual subsets of the modified, user-entered situation. The sixth step 36 provides for mapping the modified, user-entered situation to a matched action within the given case base. The seventh step 38 provides for creating a new case comprising the user-entered situation and the matched action.

BRIAN method 10 is said to be networked because its case bases and generalizations are segmented by domain, where segments 20 are networked for parallel processing, its domains are processed using sequential layers 18, and knowledge is transferred to its layered architecture through the use of distributed components 16. Despite the almost unlimited storage made available by today's (networked) computers, matching syntactically distinct situations to the properly adapted cases requires the use of segmentation and domain specificity.

Situational awareness is an extension of information fusion, which focuses on incorporating human decision-making in the fusion process. In BRIAN, situational awareness takes the form of a human user updating the case base with random knowledge, where appropriate. This knowledge may be cached for speed. Also, akin to the human capability for creating long-term memories via the process of long-term potentiation, which involves a physical change in the structure of neurons as the mechanism by which short-term memories move into long-term storage case situations and actions should be randomized to iteratively extract random sub-situations and random sub-actions along with their macro definitions. A 3-2-1 skew process (described below and represented in FIG. 3), when combined with active use, may provide the key for accomplishing this.

Figure 3:
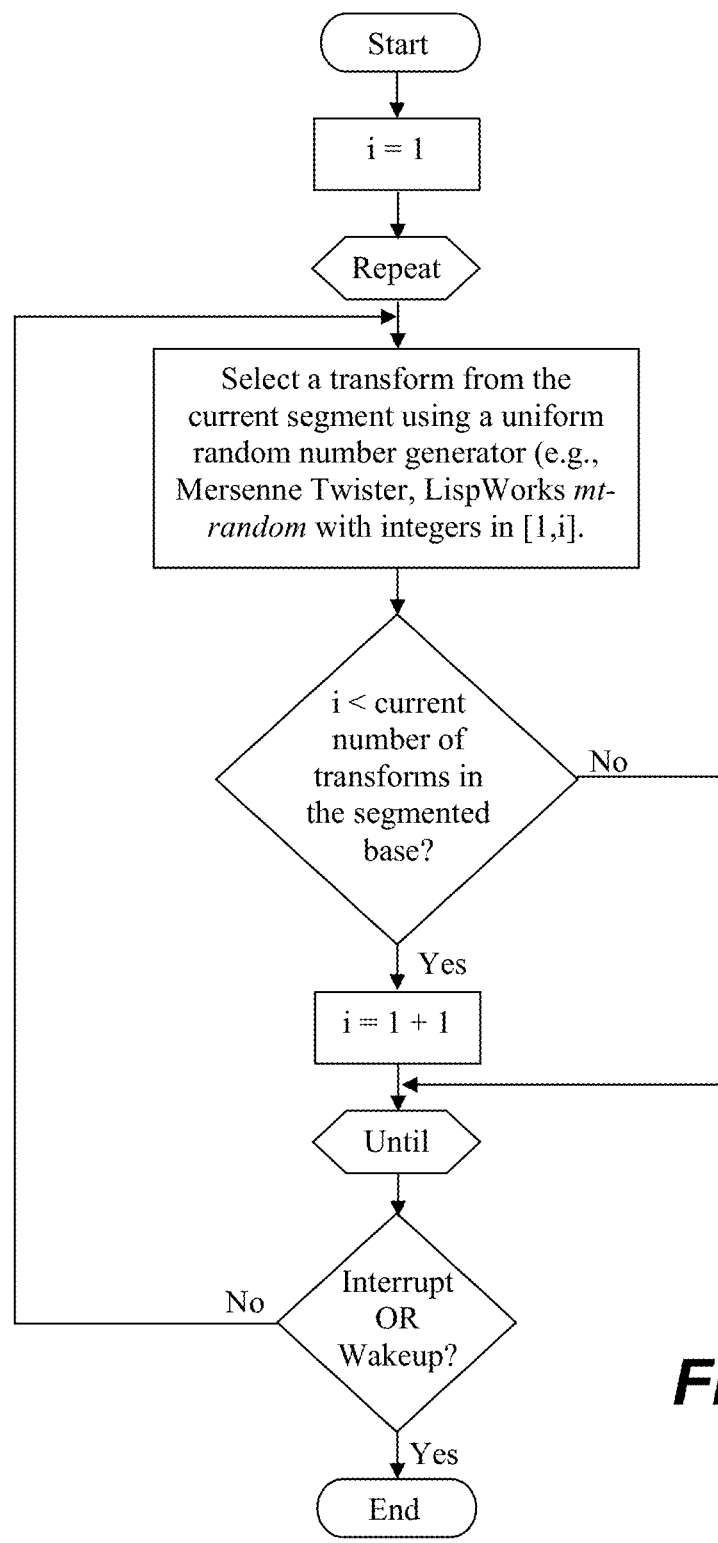
FIG. 3 is a flowchart of a 3-2-1 skew algorithm.

FIG. 3 is a flowchart depicting the 3-2-1 skew process 40. Cases, which were most-recently acquired or fired (and thus appear at or nearer to the logical head of a case-base segment), are proportionately more likely to be fired. Each processor/ segment independently realizes this skew for its local memory. The closer a case is to the top of its linked list, the greater the likelihood of its early selection. The 3-2-1 skew favors just the relative head of the segments logical list of transforms during naps (i.e., dream mode), which is proportionately most likely to yield their successful generalization, in situ manual randomization, or other task.

The following assignment of probabilities favors the logical head of the case base segments, and associated transformation lists, in keeping with Denning's principle of temporal locality. That is, cases, which were most-recently acquired or fired (and thus appear at or nearer to the logical head of a case-base segment), are proportionately more likely to be fired under the 3-2-1 skew. If multiple processors/segments are employed, each processor/segment independently realizes this skew for its local memory. Such distributed/segmented processing also serves to ensure tractability. It similarly ensures that the employed methodology will subdivide the cases into relatively short blocks, known as segments, so that all cases will remain relatively accessible in practice.

As stated above, the closer a case is to the top of its linked list, the greater the likelihood of its selection. The 3-2-1 skew process achieves this with a segmented application domain base of C cases by assigning the head case a probability of being selected of $$\frac{2C}{C(C+1)}.$$

The map just below the head map has a probability of being selected of $$\frac{2(C-1)}{C(C+1)}.$$

Finally, the tail map of the segmented case base has a probability of being selected of $$\frac{2}{C(C+1)}.$$

The ith map from the head has a probability of being selected of $$\frac{2(C-i+1)}{C(C+1)},$$

for $i=1, 2, \ldots, C$. The algorithm shown in FIG. 3 has the added advantage of favoring just the relative head of the segments logical list of situational transforms during very short execution times in dream mode (i.e., naps), which is proportionately most likely to yield their successful generalization. The 3-2-1 skew may be used to create plain situational transforms as well as action transforms and their generalizations when in dream mode. It may also be used to select sub-situations and sub-actions for in situ manual randomization. Here, the only permitted bias is recentness of acquisition or use.

A. Comparison with Expert Systems

The BRIAN case base reasoning (CBR) system differs from and is superior to expert systems because the knowledge engineer need only be concerned with contributing features inducing the elicitation of any specified action(s) (including possibly parametized sketches). That is, unlike expert systems, BRIAN does not require the user to know the most-general rules—knowing the least-general cases will do in lieu. Then too, for this reason, BRIAN can be successfully segmented, layered, and defined as a System of System's components for an even more intelligent architecture (as shown in FIG. 1).

B. Overview of BRIAN

In summary, the methodology underpinning BRIAN is to map situations to actions such that the situations may be effectively adapted, where appropriate, to the current context and the resultant actions respect these adaptations (e.g., through parametization). Situations are best handled as limited responses to a set of acquired natural language (NL) questions. Actions may include illustrations and are conveyed using sequenced and parametized NL—including NL answers and/or questions to be fed back into the current or some other contextual situation—including reallocating the set of matched components and thereby potentially iteratively altering the matched situation (s).

Intra-domain analogies are created when this process occurs within domain segments. It does not make sense for this process to occur across domain segments—not only because of the limited availability of computational resources, but because analogies created by such processes are far less likely to be valid. Rather, inter-domain analogies may be had through the domain-specific application of BRIAN actions through defined components.

NL can be spirally developed into effective code to autonomously perform such tasks as sensor interpretation. This process can be assisted by the system of systems design of BRIAN, which serves to further randomize and thereby extend its utility. The implementation language of choice is the computer program language LISP.

The 3-2-1 skew may be used to stochastically select a more recently fired case situational transform for candidate randomization. Random sub-situations and random sub-actions are defined to be case situations and/or case actions respectively, which share a common corresponding subset/subsequence with two or more distinct cases, respectively. Again, pattern matching does not extend across segments. Also, it is computationally more efficient to randomize segment situations and actions independently.

For example, consider the following two cases and their extracted sub-situations and sub-actions. It is to be understood that while the following examples relate to weather, BRIAN method 10 may be used in any desired field. Here, AND is represented vertically and OR is explicitly shown. NOT is implicitly captured by the text of the situation or action. Collectively, both situations and actions have the representational generality of an And/Or tree (i.e., a context-free grammar (CFG) of phrase structures), which is theoretically bounded above by the generality of a Type 0 grammar and below by the specificity of a CFG. In effect, it is theoretically rich enough to efficiently express any concept, or decision process, which utilizes them.

| Case 1: | |
|---|---|
| Situation: → | Action: |
| 1. Is it cloudy? Cumulous OR . . . | 1. Prepare for a thunderstorm. OR . . . |
| 3. Is it freezing? No | 4. Seek shelter from the rain. |
| 4. Is it raining? Yes OR . . . | 7. Do not stand under a tree. |
| 5. Is it windy? Very | 24. Do not be the highest object. |
| 7. Is it afternoon? 2:00 PM OR . . . | |

| Case j: | |
|---|---|
| Situation: → | Action: |
| 1. Is it cloudy? Clear OR . . . | 1. Prepare for a sunny day. OR . . . |
| 3. Is it freezing? No | 4. Seek shelter from the sun. |
| 4. Is it raining? No OR.. | 5. Put suntan lotion on. |
| 5. Is it windy? No | 13. Take time to smell the roses. |
| 7. Is it afternoon? 11:00 AM OR . . . | |
| Sub-Situation: | Sub-Action: |
| 1. {1 ( ), 3 (No), 4 ( ), 5 ( ), 7 ( )} | 1. [1 ( ), 4 ( )] |

C. Case Parametization

We see in the example cases above that cases 1 and j were stochastically selected by the 3-2-1 skew from those recently acquired or fired. This (adapted) skew is applied to cases as well as to their situational and action transforms on a segment by segment basis. Situation questions and action statements are numbered and parametized. Situational questions comprise a parametized set, while action statements comprise a parametized sequence and may incorporate parametized questions, which can feedback to augment the current or some other situation. Parameters may also be indexed to save space and time. Notice that parameters need not be specified. In this case, it befalls the user to provide the proper parameters, where the system will only provide the proper situational questions and non-parametized actions. The acquisition of new cases by a segment can serve to induce the creation of instances of (or additional) sub-situations or sub-actions (i.e., in the form of macros).

Note that open parameters, "( )" are wildcards and match any instantiation having the same integer (i.e., situational question or associated action, as appropriate). When the user is presented with a sub-situation or sub-action having a ( ), they must provide an appropriate parameter before being allowed to proceed. Only the situations associated with the best-matching case in the best-matching segment (i.e., in sequence and by domain) will be provided to the user. Most significantly, sub-situations may be presented in any order, since they are set-based; whereas, sub-actions are order dependent, since they are sequence-based.

D. Case Preprocessing

A delimited first-order predicate logic may be used to separately preprocess the situations and actions so long as validity and tractability can be ensured. However, such a front end may be added to BRIAN subsequent to its successful completion. A simple example of such a logic is taken from the situations: Is it raining? Yes→Is it cloudy? Yes (i.e., 4 (Yes)→1 (Yes)), where it must be cloudy to rain (i.e., perhaps except in Hawaii). Notice that the cloud type cannot be assured. Thus, an additional question or two must be inserted into the context as a relevant action if the parameter here is Yes; namely, "What is the cloud type?"

E. Case Randomization

The algorithm for finding sub-situations and sub-actions randomizes the supplied pairs, where possible. These randomizations may already be in the sub-bases. However, if not, then they may be subsets/subsequences or supersets/supersequences of the now possibly instantiated sub-situations/sub-actions known by the segment, respectively. Randomization requires that this new material be acquired so as to extract out the common elements in a manner similar to that just illustrated. Also, the randomization algorithm(s) should favor randomizations that give the largest compression. The 3-2-1 skew is used to find candidate pairs of situations and actions to randomize. Thus, the likelihood of randomization bears proportion to the recent utility of the situation/action.

The advantage provided by sub-situations and sub-actions is that the former is used to iteratively suggest the most appropriate questions and the latter is used to define the proper sequence of actions. This can be used to greatly reduce the storage requirements for case knowledge in symmetric domains (e.g., mathematics, chemistry, et al.), but more importantly, given the enormous amount of random access memory (RAM) available in modern computers and beyond, sub-situations and sub-actions serve to ensure that details are not overlooked when specifying new cases for acquisition.

F. Possibilities

For example, suppose the user enters the situation from an indexed list, "Is it raining?" The system will demand an immediate answer to this question (e.g., Yes) before he/she will be allowed to proceed with its use. The response can be that it doesn't matter (i.e., "( )"), or this immediate context can be passed to an appropriate domain-specific companion system for possible resolution. Next, the system will ask if sub-situation, 1. {1 (Cumulous), 3 (No), 5 (Very), 7 (3:00 PM)} are appropriate questions and answers, where previously-answered questions (e.g., 4) are excluded.

The list of possible alternative specifications is delimited by each instantiation made by the user when instantiating sub-situations and sub-actions. (That is, each successive constraint serves to limit the available choices for the remaining variables.) If properly performed, the system will correctly provide the action sequence for Case 1 with an almost 100 percent possibility. If not, the user will be allowed to use an editor to correct any answers, delete any questions, and/or add any new questions and answers, as desired.

At this point, the situation will be passed to the generalization and analogy engine, which will return a candidate action as well as a possibility based on the number of covered situational predicates as well as the relative position of the matched situation in its segmented base. A good heuristic for calculating this possibility in a static domain is given by $$\left(1 - \frac{1}{csp + 1}\right),$$

where csp is the number of covered situational predicates (all must be covered for a possibility to issue). A good heuristic for calculating this possibility in a dynamic domain is given by $$\left(1 - \frac{1}{csp + 1}\right) * \left(1 - \frac{lps}{|segment| + 1}\right),$$

where additionally lps is the logical position in the segment of |segment| cases. That is, lps is the position with respect to the segment's head (i.e., 1, 2, . . . , segment). The true possibility is said to be bounded below by the dynamic possibility and above by the static possibility. The action is generally chosen from the segment presenting the highest mean possibility. If the user replies that the action is incorrect, then he/she will be able to edit it to effect repairs and/or use the segment's macro definitions to aid in the correct specification (see below).

G. Macro Definitions

The user may of course supply any sequence of actions having any parameters. However, the system will iteratively attempt to interact with the user and apply macro definitions to extend that, which the user has already specified. Here, if the user were to specify the segments action 1 (i.e., Prepare for a _____), the previous parameters would be recalled as {thunderstorm, sunny day}. Next, the user would be required to select a previous parameter, or specify one of their own, which would then become a known parameter. If here the user selects, "sunny day", then the system would instantiate and present sub-action 1—[1 (sunny day), 4 (sun)] for a candidate partial specification in sequence.

Again, the list of possible instantiations is delimited by each instantiation made by the user, where known by the segment. The user could use the editor as before to make any changes/updates to the proper action for the specified situation. New situations and actions are subject to forming new sub-situations and sub-actions in accordance with the randomization performed using the 3-2-1 skew as previously explained.

Sub-situations and sub-actions can be presented to the user one by one. However, as previously mentioned, there is a far faster and more effective way to do this in many instances, which makes use of in situ manual user definitions. For example, instead of sub-situation 1, the user could supply the mnemonic, "Warm Weather" and instead of sub-action 1, the user could supply the mnemonic, "Weather Cautions". Furthermore, parametized mnemonics force the user to only allow such randomizations as make conceptual sense and thus are potentially reusable. The non randomized remnants are then free to be combined into other concepts (and concepts of concepts) when possible.

It follows that mnemonic randomization may only be effected by a user or companion system (see below). Here, situational mnemonics are iteratively delimited by (paramerized) mnemonics and/or situations in any order. Similarly, action mnemonics are iteratively delimited by (paramerized) mnemonics and/or actions in sequence. Existing situations and actions are randomized by their mnemonics when iteratively found. Macro definitions are checked at the time of expansion to prevent an infinite recursion. For example, it would be allowed to store the macro definition of "big" as "not-small" as well as the definition of "not-small" as "big". However, then any expansion of "big" would be halted when this macro repeated as it does here. This pair of macro definitions serves to inform us that "big" and "not-small" are equivalent. More complex definitions will follow suit.

The parameterization of macros includes a symbol table for the specification of the associated lower-level parameters. This table is used to instantiate macros one-level deep. Thus, multiple levels are instantiated through the iterative use of this table. Local tables may be separately (logically) maintained for each segment—including situations, situational transforms, actions, and action transforms (and associated local processor(s)) to prevent contention on the bus. These sub-situations and sub-actions, comprising distinct tables, could be recursively embedded in others for a progressively greater savings in space and time. Parametized mnemonics enable the user to most conveniently represent situations for fusion as a prelude to a determination of an appropriate action(s) and thus a case (see below).

H. Companion BRIAN System of Systems

This randomization process may find common situational subsets with or without the inclusion of a user-supplied mnemonic definition. A new component, for use as a companion system, is defined by those segments whose every situation contains (or would contain) this maximal subset. This extracted subset or representative mnemonic defines a new specific domain. The least-frequently used (LFU) component is reallocated to make room for this component, where necessary.

The component carries this name and this subset is removed from all of its contained situations. If a component is already named by this subset, then this component is grown by the new acquisition. If a component is a subset of another on the basis of this set definition, then a domain-specific hierarchy of components is created (e.g., trees, deciduous trees). The induced structure is that of a graph (i.e., not necessarily a tree) because the subset may be common to more than one component. The creation and management of component graphs is a set-theoretic operation, which lends itself to hierarchical processing for an exponential speedup.

The collection of all components processing a context must be comprised of those incomparable supersets, which are subsets of the context. This means that if one component were to extract say, {a, b, c} another could not extract {a, c} from the same context because this is a subset, but it could extract {a, d} because the resulting set pair is incomparable. Thus, the incomparable collection of sets, which are subsets of the context, will be comprised of the supersets of the collection. If all component definitions are incomparable with the context, a new component is created. The definition of this component's label will be taken as the context. Not only is this choice most specific, but there may be more than one incomparable subset of the context and the selection of all of them would increase the number of components by the order of the Power Set, which is clearly unacceptable and wrong. This also provides us with another reason why it is important to order the training instances from simplest to most complex [18]; that is, so as to maximize the discovery of similarities by component extraction. After extracting the component definition from the context, we are left with the default case of { }→Action.

A context is simultaneously processed by all components, whose definitions are a subset of it. Each particular member subset is extracted from the context prior to it being processed by the component's layers and segments.

Notice that this process also serves to induce stronger intra-segment analogies as a result of ever increasing domain-specificity. It also ensures that cases in any system segment will be random relative to every other system segment. This means that the reusability of all system knowledge will be maximized. Thus, BRIAN will learn faster and faster concomitant with scale—all else being equal.

I. Optional Broca/Wernicke Correction

First, consider the situational description, "I would like to know if I will get wet if I venture outside." The proper way to express this concept as a situational query may be, "Is it raining?" The user can create a simple segmented knowledge base to correctly make this transformation where needed (i.e., on the basis of user feedback). A more complex rendition here would attempt generalizations and thus would need to check for induced contradictions (e.g., It is raining≠>It is sunny).

This function is similar in effect to that of Wernicke's Area of the human brain. In other words, a pre-BRIAN companion system(s) may be used as a pre-processor 22, such as shown in FIG. 1, which akin to Wernicke's Area learns to transform the syntax of appropriately styled NL into situational queries for presentation to the user, or other component system.

Next, consider the assumedly proper action, "Do not stand under a car." The grammatically proper way to express this concept may be, "Do not sit in a car." The ardent user can create a simple segmented knowledge base to correctly make this transformation where needed (i.e., on the basis of user feedback). A more complex rendition here would attempt generalizations and thus would need to check for induced contradictions (e.g., stand under a car→sit in a car—see below).

This function is similar in effect to that of Broca's Area of the human brain. In other words, a post-BRIAN companion system(s) may similarly be used as a post-processor 24, such as is shown in FIG. 1, which akin to Broca's Area learns to correct the syntax of the action(s) prior to their presentation to the user, or other component system. It may well be that the phenomenon of consciousness arises from massively parallel non-linear analogical transformation.

J. The Need for Segmentation

Parameter substitutions must be context sensitive—suggesting, in theory, the use of a context-sensitive grammar having a capability for generalization, for their capture. We will implement the same using a more pragmatic method (see below). For example, the difference between a pencil and a pen might be generalized away until the issue of capability to be erased becomes germane to the segment. Case bases again must be segmented, new cases acquired, and invalid cases expunged, among other lesser details. Segmentation is fundamental to the proper operation of generalization and analogical reasoning—not to exclude the method(s) for mapping knowledge to the proper segments (including the creation of new segments)—see below.

K. Computational Analogy

Intra-segment generalization leads to analogical reasoning because what is known to work in one specific situation is allowed to apply to other closely-related situations, which may or may not be appropriate in accordance with further refinement. We note that analogical reasoning is more likely to work within than between segments due to the common domain defining segments. It follows that since analogical reasoning breaks the formal chain of reasoning, it can solve problems that are not solvable using various decision-theoretic formalisms (e.g., first-order logic—quantified variables, implications, negations, graph-theoretic, number theory, et al.). As a practical result, analogical reasoning allows for the generation of conclusions with at least some possibility of error that would otherwise be intractable (if not undiscoverable) using formal reasoning, which has no chance of error.

Heuristic reasoning using NL is a very attractive idea—there is a vast amount of general and domain-specific knowledge easily available in NL, which addresses the issue of knowledge gaps, and the redundancy of heuristic reasoning methods provide robustness to noise and reliability in answers. Computational analogy provides heuristics for pattern matching as well as for finding novel heuristics themselves and no strictly formal method, such as the predicate calculus, can serve in lieu.

L. k-limited Transformation

Figure 4:
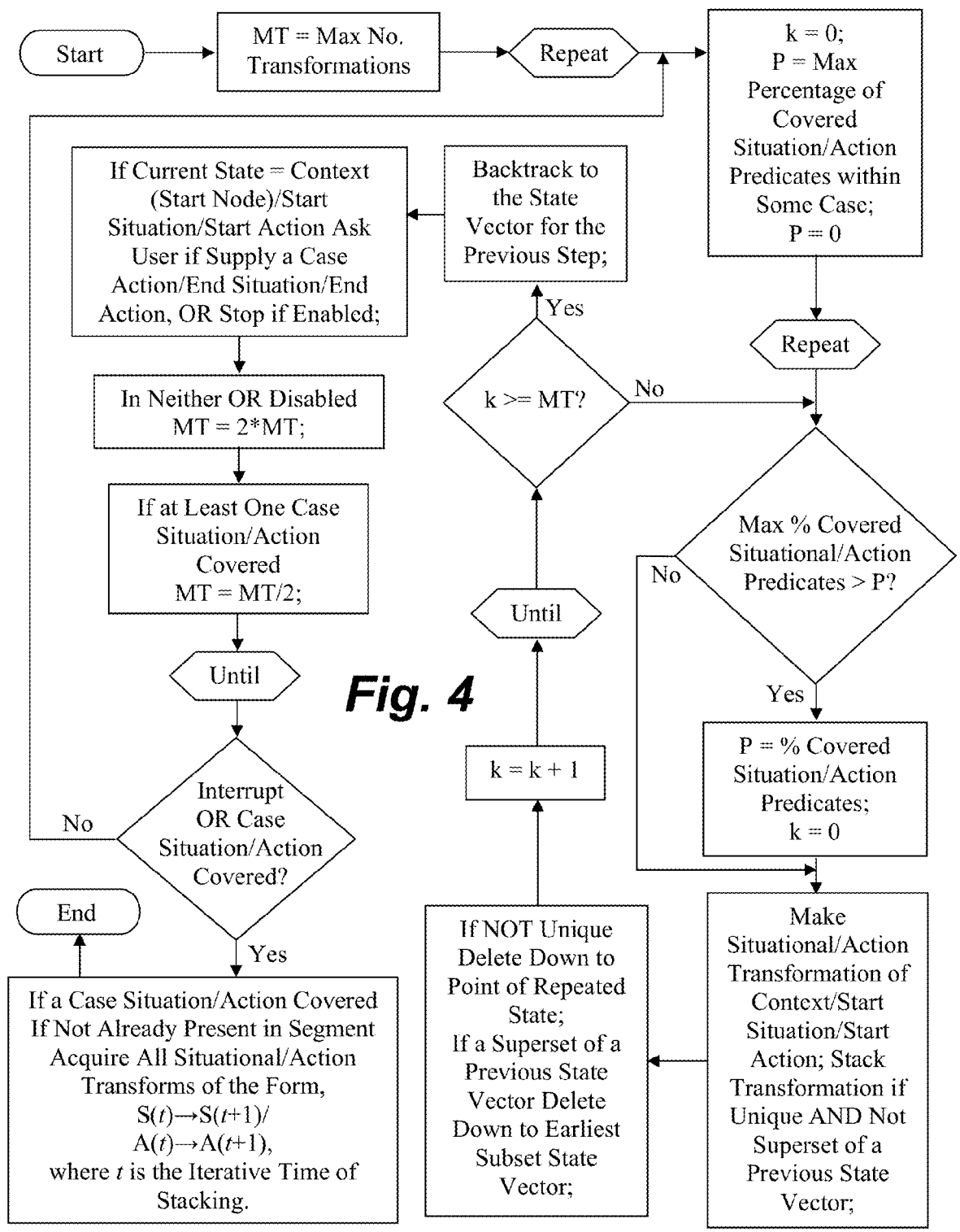
FIG. 4 is a flowchart of a k-limited transformation.
Figure 5:
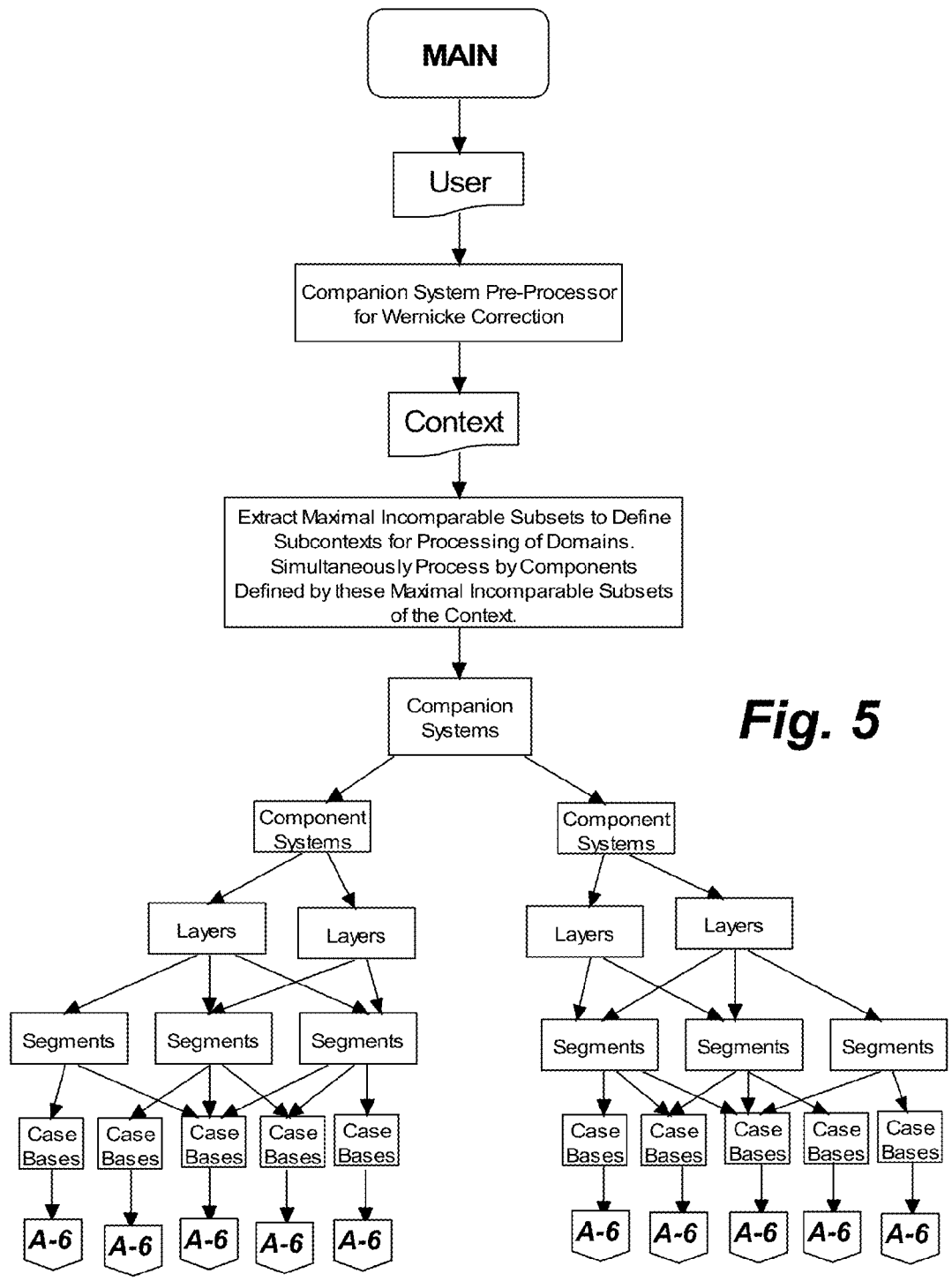
FIG. 5 is a flowchart of an embodiment of a basic regimen for intelligent analysis using networks.
Figure 6:
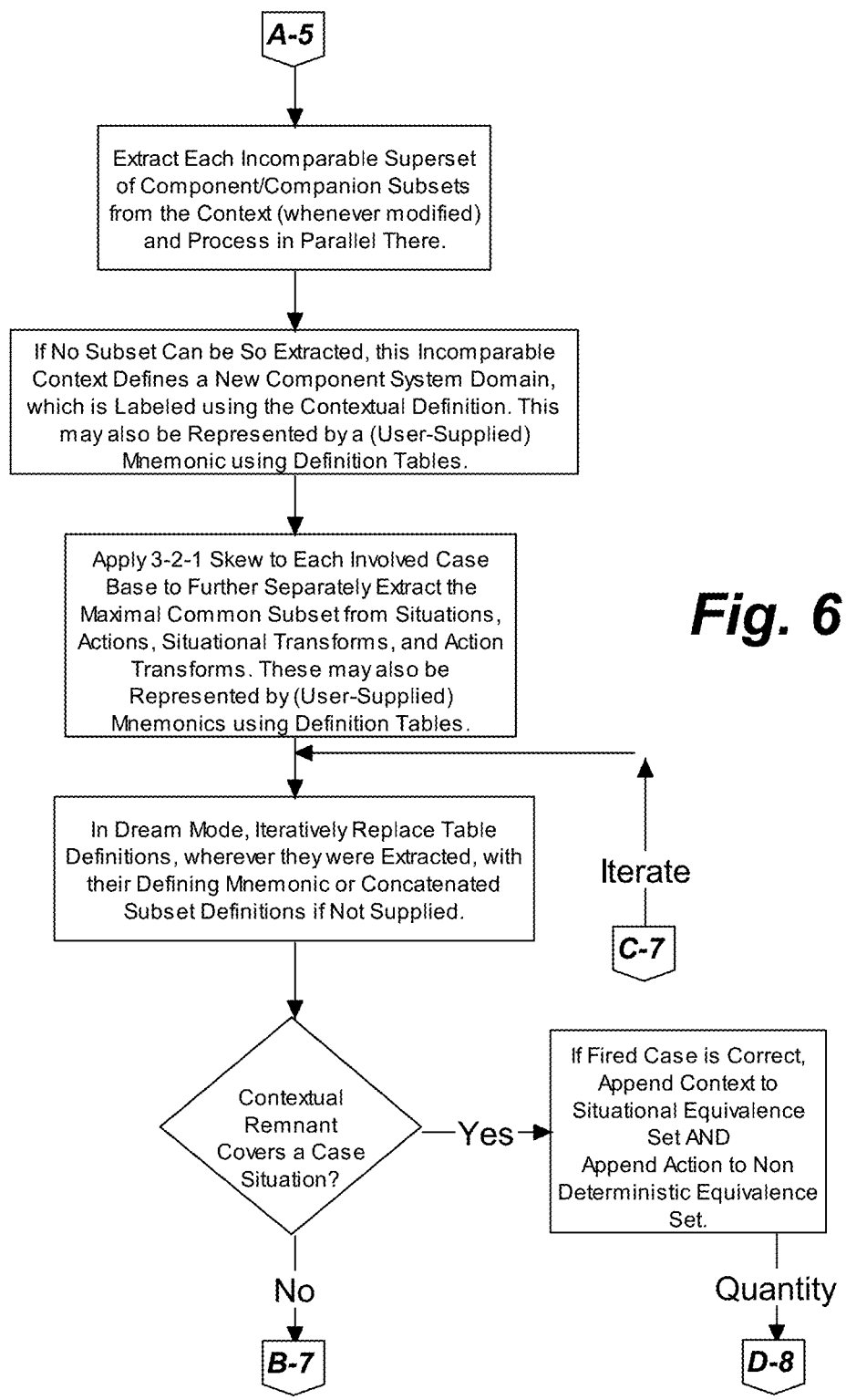
FIG. 6 is a continuation flowchart of an embodiment of a basic regimen for intelligent analysis using networks.
Figure 7:
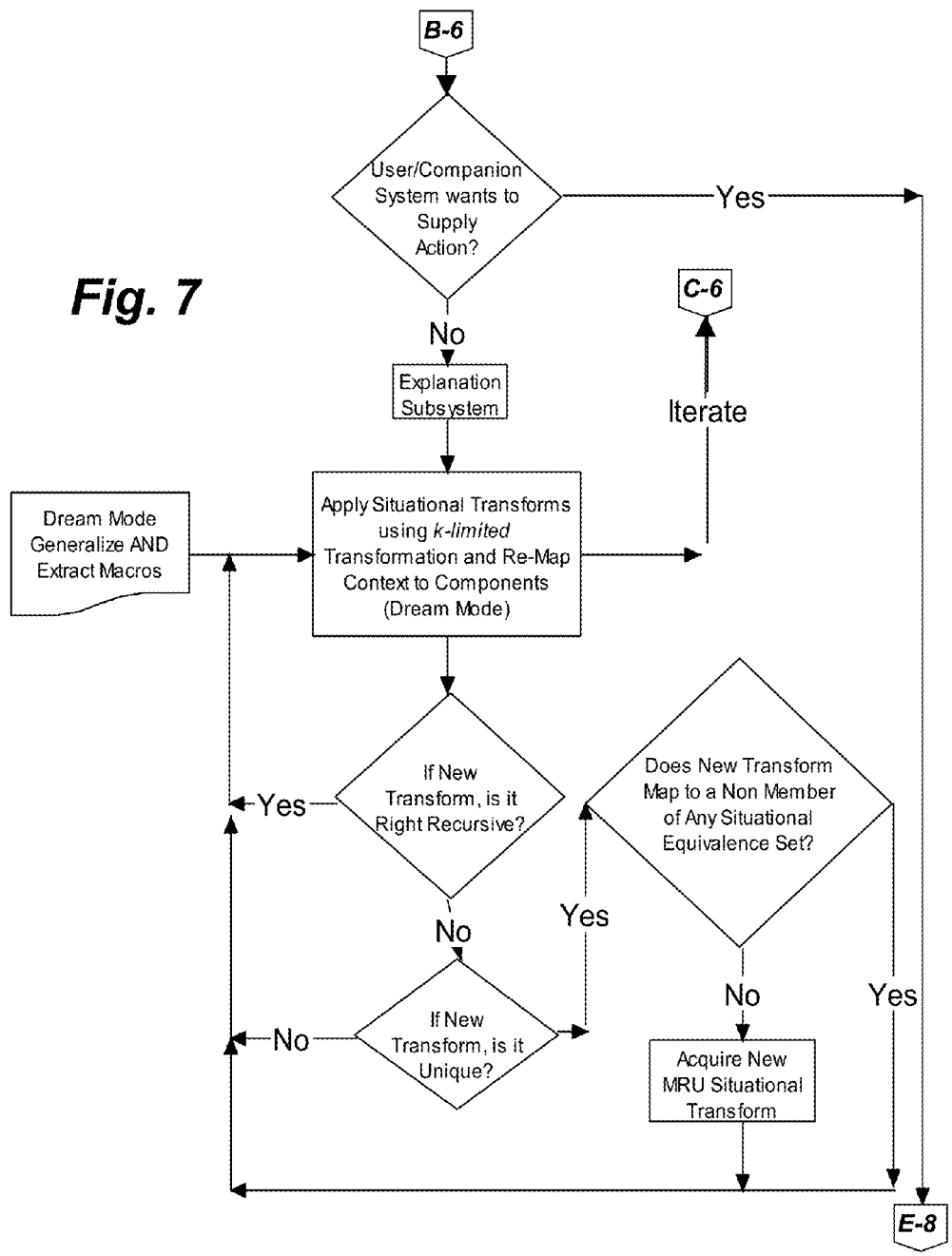
FIG. 7 is a continuation flowchart of an embodiment of a basic regimen for intelligent analysis using networks.
Figure 8:
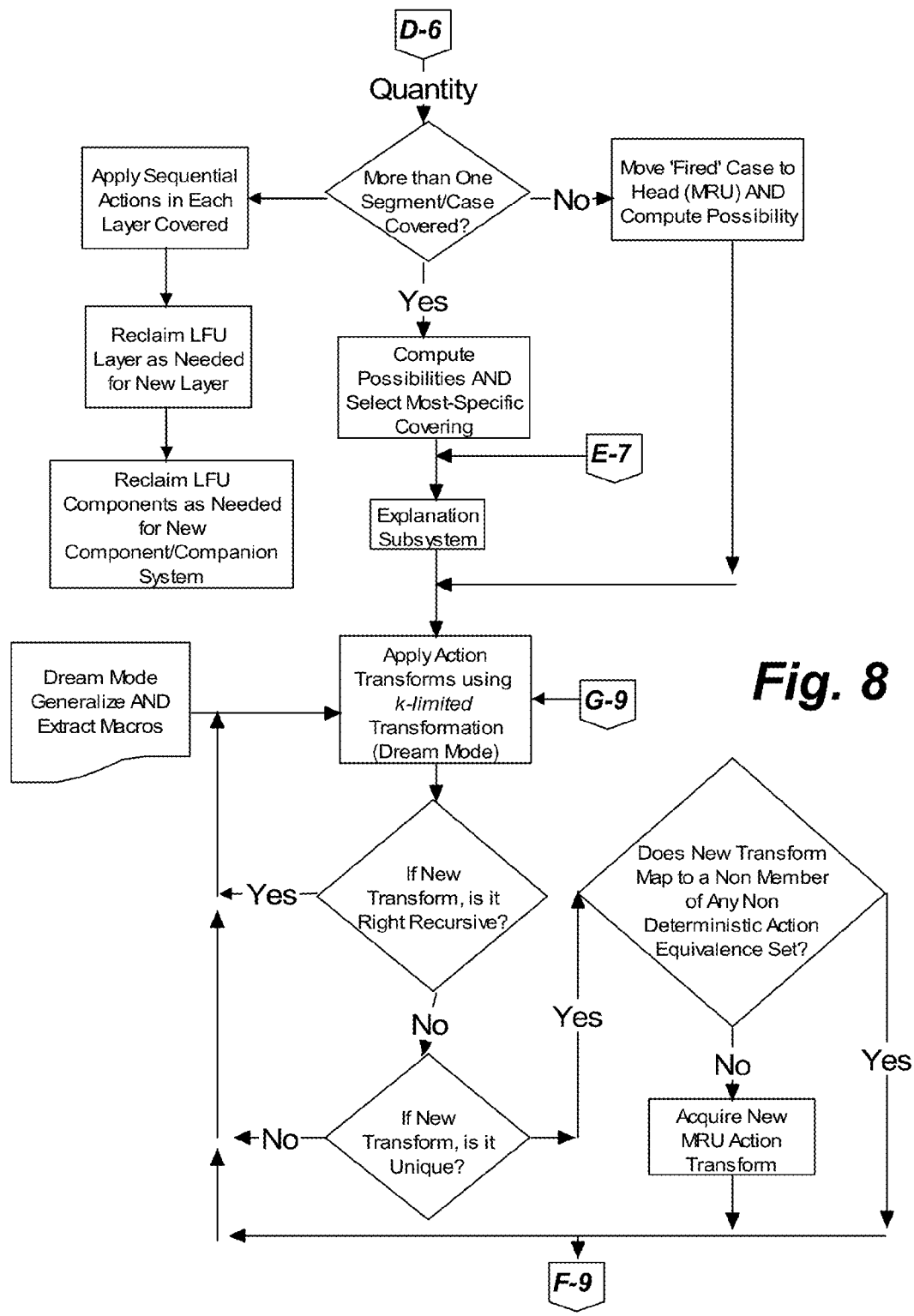
FIG. 8 is a continuation flowchart of an embodiment of a basic regimen for intelligent analysis using networks.
Figure 9:
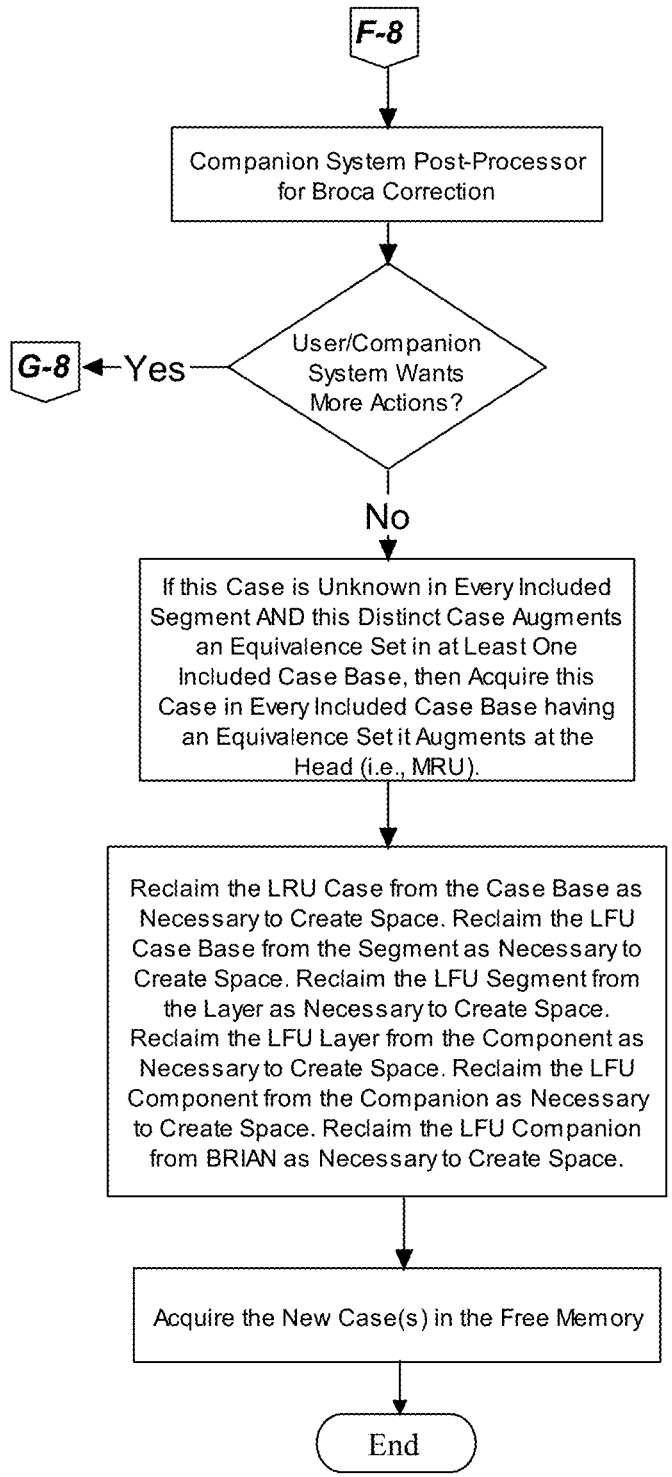
FIG. 9 is a continuation flowchart of an embodiment of a basic regimen for intelligent analysis using networks.

FIG. 4 is a flowchart illustrating a k-limited transformation 42. A k-limited transformational Type 0 grammar can be used to equate distinct situations resulting in the same action. Here, $S_i \leftarrow \rightarrow S_j$ and can be generalized (for analogical reasoning) by eliminating identical terms from both sides. Care must be taken not to over-generalize, which would map a segmented situation to an improper situation and thus to an associated improper action as well (i.e., one not a member of the known associated non deterministic actions), which of course was not the case prior to the inclusion of the candidate generalization. In particular, FIG. 4 shows how to prepare acyclic and non right-recursive transforms. While the user may wish to include such cycles, as was the case for "big" and "not-small" presented above, they need to at least be warned of the presence of such cycles prior to inclusion. The extension of these benefits to action transforms is straightforward.

A context is hill-climbed for a solution to a problem by applying one or more (iteratively) matched situational transforms chosen using the 3-2-1 skew. The difficulty arises where hill-climbing is too specific to capture a viable solution and exhaustive search is too general a methodology to be tractable. An ordered search heuristic is presented herein, which maintains tractability while utilizing generalized hill climbing to search for a solution. Attempts to synthesize a match for the context are k-limited. This means that at most k transformations of the context are permitted at each step, which is defined by the (transformed) context matching a higher percentage of some cases situational predicates than was true for the previous step. In other words we iteratively hill-climb mapping the context using a maximum of k transformations. Situational maps have as their goal, mapping a context to a case situation. Situation to action maps have as their goal, mapping a case situation to a case action.

The locally (i.e., within a segment) transformed context is evaluated for a match against its contained situations after each transformation (but not for more than k successive transformations without an increase in the percentage of covered situational predicates within some case). An associative memory may be used to speed-up the matching process. Again, if ever the percentage of situational questions covered within some case, by an iteratively transformed context, increases then reset the count of k to zero and the current maximum of matched situational predicates to that maximal percentage now covered for some case.

If k successive transformations do not yield a higher percentage of matched situational predicates than the current maximum (i.e., a more-specific match), backtrack to the state vector for the previous step. If backtracking takes us back to the context (start node) ask the user if they would like to supply a case action or stop and if neither, double the value of the allowed maximum number of transformations, and repeat the search process with provision for an interrupt exit. Conversely, if the context is mapped to cover at least one case situation, halve the value of the allowed maximum number of transformations. Cases are thus fired and corrected in accordance with the non deterministic algorithm described. Each successive transformation of the context is stacked. If ever a stacked state vector is repeated, the transformation leads to a cycle so return to the node associated with that state vector (deleting the intervening state vectors) and don't reset the count of k. There will be at most one such node.

More generally, if ever a stacked state vector is a superset of a previous state vector on the stack, the transformation leads to right recursion (e.g., $f_i \rightarrow f_i f_j$) so return to the node associated with the lowest (first) subset state vector (deleting the intervening state vectors) and don't reset the count of k. There may be more than one such node. It would not be practical to use associative memory here. Whenever an (iterative) transformation of a context covers and thus leads to the firing of a case, one or more situational transforms are acquired from the stacked state vectors. For example, if the acyclic stack appeared from bottom to top, $<S_i, S_j, S_k>$, where $S_i$ is the context, $S_j$ may or may not cover some case situation, and $S_k$ must cover at least one case situation; then, two non right-recursive situational transforms are non-redundantly acquired as follows.

1. $S_i \rightarrow S_j$
2. $S_j \rightarrow S_k$

Any number of such maps may similarly be non-redundantly acquired. Non right-recursive action transforms are similarly non-redundantly acquired, where $A_k$ represents every approved action (in the transform chain). Situational transforms, action transforms, as well as their generalizations, can also be created in dream mode. Their in situ manual randomization is enabled too. Maps will be randomized during naps as new situational and action macros are discovered and iteratively extracted from their defining segments. Again, situational transforms deal with sets; whereas, action transforms deal with sequences.

M. Intra-Segment Generalization and Transformation

The BRIAN CBR system can operate deterministically or non deterministically, where the non determinism is stochastically resolved. This resolution may be uniformly random or weighted using the 3-2-1 skew on the basis of moving to the local list-head those action sequences, which are successfully applied. The key to making this work is of course to map situations to proper actions.

A search to match the (transformed) context is conducted in every component whose defining set is a subset of this (transformed) context. The component subsets will be subtracted from the context before seeking a covering in its segments. The transformed context is expanded and mapped to a possibly new set of components before proceeding, if not currently matched. Deleting erroneous transforms then results in a highly non-linear feedback loop, which iteratively converges on better and better transforms over all involved components.

A best match for any context is sought in parallel from each case-based segment. Distinct situations may imply the same intra-segment action(s) and this enables these situations to be semantically equated as previously described. Similarly, non deterministic distinct actions may be implied by the same intra-segment situation (s) and this enables these actions to be semantically equated for use as alternative action plans.

The resulting context-sensitive production rules, if any, and their valid situational generalizations, if any, may be iteratively applied to a context until a situational match is obtained, or until the user specifies a proper action sequence. Situations may only be generalized and these generalization rules retained if the generalizations produced by these situational rules cover only situations, which lead to (non deterministic) actions already known to be proper over the entire case-base segment.

During dream mode, a situational or action equivalence set are simultaneously attempted to be generalized using the 3-2-1 skew, where if successful, the situational or action transform may only map situations or actions respectively in the segment to members of their own equivalence set. This should be k-limited transformation, given the availability of sufficient processing power, without the user in the loop. Here, the process of generalization entails uniform random deletion of an identical situational predicate (action predicate in the same sequence) from the left and right-hand sides as well as the selection of the equivalence set for attempted generalization using the 3-2-1 skew within the context of the most recently used (MRU) list paradigm.

Non deterministic situations or actions in the "fired" equivalence set are presented to the user in MRU order. Next, upon user allowance, situational or action transforms, if any, are iteratively applied to a situation or action, which is selected using the 3-2-1 skew, where the sequence of applied transforms is determined using k-limited transformation and the results of each transformation are presented to the user for adjudication. Intermediary results are stacked in order that the same situation or action is never presented more than once to the user or companion system by checking stacked memory. The user may interrupt the system at any time (e.g., to supply a correct situation or action). In this manner, the user may receive streamed creative (analogical) situations or actions, which may not be formally deducible. More generally, this stream will supply user responses for all but the dynamically-defined most random (i.e., similar to the highest level) companion system. This capability is desirable to support creative thinking and research.

All proper intermediary actions are paired with the most recent situation to create cases, which are cached and acquired when the processor(s) are free in the same manner as are any other cases. The transformed context must be (a) validated by the user, (b) contradicted by the user, or (c) modified by the user. In the case of (a), an action may be forthcoming. In the case of (b), (generalized) context-sensitive situational production rules will be expunged. In the case of (c), a more-specific (i.e., first to fire) context-sensitive situational production rule will be acquired and subject to possibly successful generalization. Note that all successful generalizations are abductive (i.e., the opposite of deductive) in that they seek to minimize the operational constraints to that minimal set absolutely fundamental to the successful transformation of the context. Synthesized situations become a permanent part of the case base through logical acquisition.

In particular, in the case of (b), if exactly one situational production rule was applied, it will be expunged. However, if two or more situational production rules were applied in sequence in the situational transform, then just one or both may be in error. The user may trace the transformation, which will result in being able to identify each erroneous transform. If the user is not sure or a judgment is not forthcoming, the questioned situational transform(s) is logically moved to the bottom of its segments list, where it is most likely to be reclaimed to recover space or at least be last to be matched, within its segment, in any future application.

Similarly, the association of one action with a given situation allows one or more non deterministic alternative actions to be logically appended to that pairing. Actions may only be generalized and these generalization rules retained if the generalizations produced by these action rules induce no non deterministic action not already known over the entire case-base segment. The alternative actions must be (a) validated by the user, (b) excluded by the user, or (c) modified by the user. In the case of (c) and an acquisition in general, a more-specific context-sensitive action production rule will be acquired. Such production rules are applied to synthesize non deterministic action sequences, which unlike simple rote storage may be creative (due to the unforeseeable ways in which it may apply, either alone or in sequence with other action transforms)—and thus subject to error. Synthesized (non deterministic) actions become a permanent part of the case base through logical acquisition.

In particular, in the case of (b), if exactly one action production rule was applied, then it will be expunged. However, if two or more action production rules were applied in the action transform, then just one or both may be in error. The user may trace the transformation, which will result in being able to identify each erroneous transform. If the user is not sure or a judgment is not forthcoming, the questioned action transform(s) are expunged.

N. Mapping Segments

Whenever a segment acquires a distinct new case, an exact match (i.e., including parameters) for its situation is sought in the segment in parallel with a search for an exact match (i.e., including parameters) for its action in the segment. Indeed, such a search is what brought the case to this (and possibly other) segments. Ideally, this pattern matching process will utilize associative hardware, but even a simple linear search may suffice in each segment. If the segment is not empty, this may yield situational and/or action transforms from distinct cases stored there, where these are candidates for generalization during periods of non use (i.e., dream time).

Logically, a new segment is created and assigned a distinct processor(s) whenever (a) the attempted acquisition of a distinct new case induces neither an action nor a situational transform in any existing segment, or (b) the magnitude of a segment exceeds by some measure the processing power of the assigned processor. Cases are properly acquired by all segments where a situational or an action transform is induced. Note that all situational transforms here share the domain-specific definition of a common component (i.e., this process never transpires across components). This will result in redundant storage of high utility, where the redundancy can be shown to be limited by a factor of two on average.

Segments may be claimed for reuse if no case within them successfully fires or is acquired within some quantum. As a practical matter, this quantum is set relative to the number of available processors in order that the LFU segment (i.e., as identified through the use of the method of transposition) will be freed to accommodate a new segment, as dictated by spatial limitations. Note that an LFU policy is preferred over a least-recently used (LRU) policy (i.e., using a logical move-to-the-head paradigm) for the reclamation of memory because the latter applies to a single case; whereas, an LFU policy applies to any domain-specific grouping of cases. Moreover, post-tetanic potentiation depends on neural clusters. Post-tetanic potentiation are defined by J. C. Eccles' *Understanding of the Brain*, New York, N.Y.: McGraw-Hill Co., 2d ed., 1976, which is incorporated by reference herein. This suggests an LFU policy based on dendritic hypertrophy.

A different critical number of processors will be needed for each intelligent system. The more symmetric is the problem domain(s), the fewer the number of mutually random (i.e., orthogonal) segments that will be needed and vice versa. It can be seen that having more symmetric domains allows for greater intra-segment analogy—implying that learning can occur at a much-higher level than mere rote (e.g., in mathematics, music, art, et al.). One can always dovetail the simulation of parallel processors on a serial machine. This provides a grace for the experimentalist.

O. Generalization Mechanics

Generalization requires that identical terms on both sides of the situational transform (and part of the same subsequence for action transforms) be selected at uniform chance for removal, again where the transform for candidate generalization is selected using the 3-2-1 skew. The candidate situational generalizations (i.e., allowing for both directions of implication) are applied to each situation, in the context of the entire space of situational transforms in a segment, using k-limited transformation. This process may result in one or more transformed situations. If a transformed situation covers a situation in its segment, then its associated action(s) must also be logically paired with the original situation (excepting allowed differences in parameter instantiations) (i.e., checking all non deterministic alternatives). The candidate situational generalization, when in dream mode, is saved just in case each and every action associated with each and every matched transformed situation is also associated with the original situation. The candidate generalization may appear to be correct to an outside observer, but it must be validated using strictly the knowledge imbued in the case segment; and, in situ manual intervention here is not cost effective. Similarly, the candidate action generalization, when in dream mode, is saved just in case each and every transformed action is a non deterministic alternative for its pre-image.

P. Example of Case Transforms

Situational and action transforms alike need only be valid in one direction of implication. Examples 1 and 2 provided below illustrate this concept. Note that situations and actions need not have the same number of or types of sentential forms (i.e., equivalent literal content) to create situational and/or action transforms. Here, the ORs to the right of any situational number (i.e., for a CFG) serve to enlarge the space of possible matched situations or produced actions, as appropriate.

Example 1, An Example of a Candidate Situational Transform:

Case 1:

| Situation: | → | Action 1: |
|---|---|---|
| 1. Is it cloudy? Cumulous OR . . . | | 1. Prepare for a thunderstorm. OR . . . |
| 3. Is it freezing? No | | 4. Seek shelter from the rain. |
| 4. Is it raining? Yes OR . . . | | 7. Do not stand under a tree. |
| 5. Is it windy? Very | | 24. Do not be the highest object. |
| 7. Is it afternoon? 2:00 PM OR . . . | | |

Case j:

| Situation: | → | Action 1 |
|---|---|---|
| 1. Is it cloudy? Cumulonimbus OR . . . | | |
| 3. Is it freezing? No | | |
| 4. Is it raining? Yes OR . . . | | |
| 5. Is it windy? Very | | |
| 7. Is it afternoon? 3:00 PM OR . . . | | |

Situational Transforms (Differences in Parameter Instantiations Only):

| Situation: | ←→ | Situation: |
|---|---|---|
| 1. Is it cloudy? Cumulous OR . . . | | 1. Is it cloudy? Cumulonimbus OR . . . |
| 3. Is it freezing? No | | 3. Is it freezing? No |
| 4. Is it raining? Yes OR . . . | | 4. Is it raining? Yes OR . . . |
| 5. Is it windy? Very | | 5. Is it windy? Very |
| 7. Is it afternoon? 2:00 PM OR . . . | | 7. Is it afternoon? 3:00 PM OR . . . |

Note:
These situations cannot be generalized using "( )" for parameters in #1 and #7 because (a) these values are restricted and (b) the correct values are dependent on the context of the entire situation.

Example 2, An Example of a Candidate Non Deterministic Action Transform:

Case 1:

| Situation 1: | → | Action: |
|---|---|---|
| 1. Is it cloudy? Cumulous OR . . . | | 1. Prepare for a thunderstorm. OR . . . |
| 3. Is it freezing? No | | 4. Seek shelter from the rain. |
| 4. Is it raining? Yes OR . . . | | 7. Do not stand under a tree. |
| 5. Is it windy? Very | | 24. Do not be the highest object. |
| 7. Is it afternoon? 2:00 PM OR . . . | | |

-continued

| Example 2, An Example of a Candidate Non Deterministic Action Transform: |
| --- |

| Case j: | |
| --- | --- |
| Situation 1 | → Action: |
| | 1. Prepare for a cloudy day. |
| | OR . . . |
| | 4. Seek shelter from the wind. |
| | 5. Put a rain-coat on. |

| Action Transforms (Differences in Parameter Instantiations and Number Actions): | |
| --- | --- |
| Action: | ←→ Action: |
| 1. Prepare for a thunderstorm. | 1. Prepare for a cloudy day. |
| OR . . . | OR . . . |
| 4. Seek shelter from the rain. | 4. Seek shelter from the wind. |
| 7. Do not stand under a tree. | 5. Put a rain-coat on. |
| 24. Do not be the highest object. | |

Q. BRIAN'S Inference Engine

Let's assume that these situational and action transforms have been autonomously validated as previously described. Consider the following Example 3, provided below, which is an example of the application of analogous knowledge.

| Example 3, An Example of the Application of Analogous Knowledge: | |
| --- | --- |
| Action: | ←→ Action: |
| 1. Prepare for a thunderstorm. | 1. Prepare for a cloudy day. |
| OR . . . | OR . . . |
| 4. Seek shelter from the rain. | 4. Seek shelter from the wind. |
| 7. Do not stand under a tree. | 5. Put a rain-coat on. |
| 24. Do not be the highest object. | |

Next, suppose that one presents the context illustrated on the left-hand side of Example 3 and that the context cannot presently cover an untransformed situation over all base segments (and layers). It is not desirable to introduce the error potential associated with the use of an analogy when it is not necessary to obtain a situational match. Analogy simply makes discoverable (albeit, not formally provable) that knowledge, which is inherently incomplete or at least NP-hard to arrive at.

| Context: | ←→ Situationally Transformed Context: |
| --- | --- |
| 1. Is it cloudy? Cumulous | 1. Is it cloudy? Cumulonimbus |
| 8. Is the pressure falling? Yes | 8. Is the pressure falling? Yes |
| 3. Is it freezing? No | 3. Is it freezing? No |
| 4. Is it raining? Yes | 4. Is it raining? Yes |
| 5. Is it windy? Very | 5. Is it windy? Very |
| 7. Is it afternoon? 2:00 PM | 7. Is it afternoon? 3:00 PM |

Notice that this context additionally contains situation #8. The transformed context (and thus the original context) maps to either of the following non deterministic actions, which we may take as being paired with a situation such as, {1 ( ), 3 (No), 4 ( ), 5 ( ), 7 (3:00 PM)}. While contextual situation #8 does not participate in this covering here, the case inference engine will preferentially select the most-specific covering.

The allowance for macros is uniformly distributed throughout the system. This means that the case having the most covered situational predicates will approximate the most-specific covering, resolving any ties in favor of the most-recently acquired or fired case (i.e., based on its position in its segments logical list) and again in favor of the most frequently acquired or fired segment (i.e., based on a similar logical list of segments) if the segments themselves are so tied.

The choice among non deterministic actions is stochastic and in this case is taken from the last successful choice among them (i.e., using a logical list of all acquired/fired (non deterministic) actions in a segment to find the MRU candidate in it), which we may take here to be the non deterministic action on the right-hand side without loss of generality. This method for stochastically resolving candidate non deterministic actions works because the same action may be fired (and thus moved to its segments case-bases head) by distinct, but associated situations.

We see that situational transforms, in combination with action transforms (i.e., non determinism), correctly maps a previously unknown context by process of analogy. If the user should find the mapped situation and/or the mapped action to be incorrect, he or she may make reparations as previously described. The erroneous (non deterministic) case(s) are expunged, or they would grow in number without bound. This will not affect the situational or action transforms because they are only constrained not to map to a known error and once a situation or action is deleted it is no longer a known error. Indeed, this may explain why it takes humans time and repetition to unlearn certain things.

A new random case may thus be acquired by one or more of the mutually random segments. Also, the explanation subsystem essentially consists of an ordered replay of the process for arriving at a match for the context—including the application of situational and action transformations, where appropriate. An allowance for user modifications is made, where repair is deemed to be appropriate.

R. The Layered-Companion Architecture

BRIAN method 10 would not be complete without a discussion of the advantages of a layered architecture and how such layering is consistent with BRIAN's overarching design. The concept will be introduced by way of example. Suppose an optical sensor registers a flash and an acoustic sensor registers delayed thunder. Given this situational knowledge, the task is to deliver the appropriate action—either, "It is raining" or "It will likely rain." This information needs to flow from the sensor hardware up to the planning layer.

The output, at the lower level, serves as input to the next, or planning level. The output at this level is determined by some fired case action(s). Here, suppose that action were the question, "Do you hear raindrops on the roof?" Each successive level comprises a fusion of information output by the prior level. Thus, on the higher or planning level one might have the situation:

1. Do you hear raindrops on the roof?
2. Raindrops likely on the roof

The user could of course read (2) and answer (1). However, this is not always necessary and would prove to be impossibly cumbersome in practice. Instead, the user may interactively teach a companion system that if (1) and (2) and . . . , then append to the higher-level context, "Do you hear raindrops on the roof? Yes"—see Example 4 below. This interactive instruction is captured in the form of cases by a companion system. Here, the situation-action pairing would be as follows. Notice that companion systems exploit information/knowledge reuse. This is another form of randomization [10].

Example 4, An Example of Case Randomization:

| Situation: | → | Action: |
|---|---|---|
| a. Do you hear raindrops on the roof?<br>b. Are raindrops likely on the roof? Yes | | a. Do you hear raindrops on the roof? Yes |

A situation is ultimately covered at the next higher level (i.e., in Example 4), which will trigger the action, "It is raining" as desired. All companion systems are BRIAN components, which architecturally comprise a networked Society of Mind. Companion systems are created and reallocated just as are segments and layers—the LFU ones are selected for reallocation.

A request for the creation of a new layer arises from any need to fuse any domain-specific information and/or knowledge, which is not currently satisfied, where the knowledge to be output by the layer can reasonably be expected to be reused. Whenever a case action supplies a situational predicate and/or an answer to a situational predicate, the case(s) receiving the situational predicate and containing it as part of its situation or similarly acquiring an answer to at least one of its situational predicates must (also) lie in a distinct layer from the case whose action is providing this predicate. If a case is both a receiver and a provider, then it need be duplicated in view of this requirement. This separation, based on inherent sequence, is a randomization, which maximizes reusability. The LFU layer is selected for reallocation.

Companion systems are defined to be composed of component systems, which currently have no superset set-generalization; that is, they are at the top of their local hierarchy. They are allocated as previously described and define hierarchical as well as heterarchical domain-specific knowledge. Companion systems maximize information/knowledge reuse. The LFU companion system is selected for reallocation. This is another form of randomization.

Of course, the same results can be had from a single-level system with or without the inclusion of companion systems. The reason for two or more levels is that the greater the number of levels, the potentially more creative the system can be because there are more opportunities for information/knowledge reuse. For example, here (2) was output by some primitive auditory sensor (i.e., along with an associated possibility). However, instead of over-extending the use of the OR connective (i.e., in the CFG for situational representation), the same conclusion could have been produced by among any number of subsystems at the lower level (e.g., by someone local on the telephone, by looking at a rain gauge, by looking for reflections from the street, et al.). The point is that each upper level subsystem can potentially reuse the information generated by each lower level subsystem and vice versa.

In fact, this defines a heterarchical architecture, since information may be passed back down too. A new layer is called for whenever there exists an unmet need to match a situation for information fusion (e.g., (1) above serving Example 4, where (2) is learned to be fused with (1) in a companion system). Akin to companion systems and their constituent segments, the greater the number of layers the greater the potential for reuse. Layers differ from segments because while segments process information in parallel, two or more layers cannot be replaced by segments because the information flow between layers is inherently sequential.

Referring back to FIG. 1, we see that layers can be skipped in the passing of information 'up' or 'down'. Again, memory is reclaimed on an LFU basis to make room for a new layer, as necessary. The process for creating new layers is isomorphic to that for creating new segments (i.e., as presented above). Each new case, new segment, new layer, new component, new companion system, and new Broca/Wernicke Correction System (which may or may not be limited to one or more component systems) may also be viewed as a mathematical randomization of the multi-layer BRIAN system of systems. Then, an intelligent learning system of systems will emerge.

The number of virtual levels is bounded above by the factorial function (i.e., levels!) in the absence of external data acquisitions, since the visited levels need not be in any specified sequence. The number of virtual levels is unbounded if external data acquisitions are allowed because repetition need not be the result as the data changes (i.e., as learning occurs) when these levels are visited (i.e., the sequence of them can be arbitrarily long). Similarly, the calling pattern to the companion systems (i.e., virtual companions) is bounded above by the factorial function (i.e., companions!) and is otherwise unbounded if external data acquisitions are allowed.

O. Further Description and Flowcharts

FIGS. 5-9 are flowcharts showing various aspects of an embodiment of the BRIAN method 10. In this embodiment, a user enters a context where it is preprocessed by the companion system pre-processor for Wernicke Correction, which pre-processor learns to transform the syntax of appropriately styled NL into situational queries for presentation to the user, or other component system. In other words, a delimited first-order predicate logic may preprocess the situations and actions so long as validity and tractability can be ensured. For example, Is it raining? Yes.→Is it cloudy? Yes.

BRIAN consists of completely connected components. Components consist of sequential layers. Layers consist of parallel segments. Segments consist of domain-specific case bases. Cases are defined by situation-action pairs. Caches buffer knowledge for acquisition during an otherwise idle moment. Situations are sets of parametized natural language questions. Actions are sequences of parametized natural language statements. Situations, actions, and parameters are defined by unique integers using distinct tables. Actions may include situations for feedback to the context. Modifying the context results in an expansion of contextual mnemonics and reallocation across possibly new components. Actions can replace one or more situational predicates, in a situation, with another. The context is a situation, which needs to be paired with a proper (non deterministic) action. A search to match the (transformed) context is conducted in every component whose defining set is a subset of this (transformed) context. The component subsets will be subtracted from the context before seeking a covering in its segments. The transformed context is expanded and mapped to a possibly new set of components before proceeding, if not currently matched.

Continuing, a best match for any context is sought in parallel from each case-based segment. A match using non-transformed contexts is always sought prior to the application of situational transforms to maximize any produced actions possibility. The vertical specification of a situation or action represents an AND or sequence, respectively. The horizontal specification of a situation or action is an OR'd alternative. OR'd lists are maintained in logical order using a most-recently used (MRU) paradigm. An MRU policy is appropriate for a single case. Situations and/or actions may incorporate illustrations (e.g., sketches). BRIAN actions may induce inter-domain analogies, which depend on the application of domain-specific knowledge. The 3-2-1 SKEW moves newly acquired or fired cases to the logical head of a list. It then progressively stochastically selects from the head of this list until it uniformly selects from the entire list. The most-recently used or acquired case comprises the working set, which is most likely to be needed in the immediate future and is thus favored. The 3-2-1 SKEW is used to independently find candidate macro situations and macro actions from within most frequently used (MFU) segments. Again, situations are sets and actions are sequences. Macro extraction requires the user (and/or companion system) to specify a mnemonic for an extracted subset or subsequence, respectively. Mnemonics may be parametized. The user may opt out so as not to be so queried and/or to automate the generation of appropriate mnemonics. Whenever the user does not specify a situational mnemonic, BRIAN will automatically label any found components (see below) using a concatenation of the terms in the maximal extracted subset.

The 3-2-1 SKEW is also used to iteratively replace macros within each segment (and within their macros, if any) with their definition when found during dream mode. This serves as a randomization. Macro definitions are checked at the time of expansion to prevent an infinite recursion. That is, macros may be self-referential, but obviously not their expansion. A symbol table is used to instantiate macro parameters one-level deep. Multiple levels are instantiated through the iterative use of this table. Separate symbol tables are maintained for each segment to prevent contention on the bus. A special type of macro is one that is common to every situation in one or more segments. If the user does not elect to supply a mnemonic here, then it is defined by the lexicographically-ordered common subset. In either case, the given mnemonic defines a new specific domain (i.e., a component). This defining subset is removed from all of its components defining situations. The LFU component is reallocated to make room for this component, where necessary.

If a component is already named by this subset, then this component is grown by the new acquisition. If a component is a subset of another on the basis of this set definition, then a domain-specific hierarchy of components is created (e.g., trees, deciduous trees). The induced structure is that of a graph (i.e., not necessarily a tree) because the subset may be common to more than one component. The creation and management of component graphs is a set-theoretic operation, which lends itself to hierarchical processing. For example, it follows that if the set say, {a, d} is not a member of {a, b, c}, then it cannot be a member of any of its subsets (sub-components) either. This fact enables an exponential speedup in the OS for component management. The collection of all components processing a context must be comprised of those incomparable supersets, which are subsets of the context. This means that if one component were to extract say, {a, b, c} another could not extract {a, c} from the same context because this is a subset, but it could extract {a, d} because the resulting set pair is incomparable. Thus, the incomparable collection of sets, which are subsets of the context, will be comprised of the supersets of the collection. If all component definitions are incomparable with the context, a new component is created. The definition of this component's label will be taken as the context. After extracting the component definition from the context, we are left with the default case of { }→Action.

Again, a context is simultaneously processed by all components, which are a subset of it. Each particular member subset is extracted from the context prior to it being processed by the component's layers and segments. Open parameters, "( )" are wildcards and match any instantiation. Otherwise, instantiations must be in syntactic agreement. Instantiating any parameter in a situation serves to delimit the candidate parameters in other situational predicates in the current segment. Instantiating the next parameter in an action serves to delimit the candidate parameters in subsequent actions in the current segment. Situational predicates may be answered by the user—if not by an appropriate domain-specific companion system, which acquires the user's proper response for reuse. The user (companion system) may edit situations and actions as well as add new questions and answers. The action is generally chosen from the segment presenting the highest mean possibility. New cases are acquired and invalid cases are expunged. All situations within a segment having common action(s) comprise an equivalence set. All non deterministic actions within a segment having common situation (s) comprise an equivalence set.

Whenever a non empty segment acquires a distinct new case it may also induce (novel) situational and/or (novel) action equivalence (i.e., in one or more segments). Cases are properly acquired by all segments where at least one situational or action transform is induced. Note that all situational transforms here share the domain-specific definition of a common component (i.e., this process never transpires across components). Associative hardware would be ideal here, but even simple linear search may suffice in lieu. A new segment is created and assigned a distinct processor(s) whenever (a) the acquisition of a distinct new case induces neither a situational nor an action transform in any existing segment, or (b) the magnitude of a segment exceeds by some measure the processing power of the assigned processor(s).

During dream mode, a situational (action) equivalence set are simultaneously attempted to be generalized using the 3-2-1 SKEW, where if successful, the situational (action) transform may only map situations (actions) in the segment to members of their own equivalence set. This should be k-limited TRANSFORMATION, given the availability of sufficient processing power, without the user in the loop. Here, the process of generalization entails uniform random deletion of an identical situational predicate (action predicate in the same sequence) from the left and right-hand sides as well as the selection of the equivalence set for attempted generalization using the 3-2-1 SKEW within the context of the MRU list paradigm. Situational (action) transforms perform analogical reasoning by way of intra-segment generalization and subsequent transformation. Situational transforms, if any/necessary, are iteratively applied to a context until a situational match is obtained, or until the user (companion system) specifies a proper action sequence. The purpose of situational transforms is to obtain an analogical match for the context when it cannot otherwise cover at least one situation known to the relevant component(s).

Non deterministic situations (actions) in the "fired" equivalence set are presented to the user or companion system in MRU order. Next, upon user or companion system allowance, situational (action) transforms, if any, are iteratively applied to a situation (action), which is selected using the 3-2-1 SKEW, where the sequence of applied transforms is determined using k-limited TRANSFORMATION and the results of each transformation are presented to the user or companion system for adjudication. Intermediary results are stacked in order that the same situation (action) is never presented more than once to the user or companion system by checking stacked memory. The user may interrupt the System of Systems at any time (e.g., to supply a correct situation (action)). In this manner, the user may receive streamed creative (analogical) situations (actions), which may not be formally deducible. All proper intermediary actions are paired with the most recent situation to create cases, which are cached and acquired when the processor(s) are free in the same manner as are any other cases.

The segment within the layer and layer within the component and component within the BRIAN system of systems having the most-specific covering (i.e., selecting the situations having the greatest possibility and favoring the one(s) having the greatest number of covered situational predicates) within the allowed search time (quantum), resolving ties in favor of the most-recently acquired or fired case and again in favor of the most frequently acquired or fired segment, if the segments themselves are so tied, and again in favor of the MFU layer, if the layers themselves are so tied, and again in favor of the MFU component, if the components themselves are so tied is selected for the response to the context. If the user (companion system) should contradict the result of any situational or action transformation, then those transformation(s) are traced when necessary (i.e., if two or more transforms are applied in sequence) and expunged where appropriate (e.g., if the reported error is the result of a single transformation). If the user (companion system) is not sure or a judgment is not forthcoming, the questioned situational transform(s) is logically moved to the bottom of its segments list (action transform(s) are expunged), where it is most likely to be reclaimed to recover space or at least be last to be matched within its segment.

The LFU segment (i.e., as identified through the use of the method of transposition) will be freed to accommodate a new segment, as dictated by spatial limitations. An LFU policy applies to any domain-specific grouping of cases. Note that one can always dovetail the simulation of parallel processors on a serial machine. Segments are allocated on the basis of domain specificity as previously described. The LFU segment is selected for reallocation. This is another form of randomization. Layers are allocated whenever a fusion of information (i.e., sequential knowledge) is called for to cover a context. This means that whenever a case action supplies a situational predicate and/or an answer to a situational predicate, the case(s) receiving the situational predicate and containing it as part of its situation or similarly acquiring an answer to at least one of its situational predicates must (also) lie in a distinct layer from the case whose action is providing this predicate. If a case is both a receiver and a provider, then it need be duplicated in view of this requirement. This separation, based on inherent sequence, is a randomization, which maximizes reusability. The LFU layer is selected for reallocation.

BRIAN's architecture is hierarchical as well as heterarchical, where information/knowledge may flow up and down in any order in its constituent systems and systems of systems. Companion systems are defined to be composed of component systems, which currently have no superset set-generalization; that is, they are at the top of their local hierarchy. They are allocated as previously described and define heterarchical domain-specific knowledge. Companion systems maximize information/knowledge reuse. The LFU companion system is selected for reallocation. This is another form of randomization. The greater the number of companion and their constituent component systems, layers, segments, case bases, and cases, the potentially more creative the system can be as a consequence of reuse.

An explanation subsystem essentially consists of an ordered replay of the process for arriving at a match for the context—including the application of situational and action transformations, where appropriate. An allowance for user (companion system) modifications is made, where repair is deemed to be appropriate. An optional post-BRIAN companion system(s) may be used as a post-processor, which akin to Broca's Area learns to correct the syntax of the action(s) prior to their presentation to the user, or other component system.

From the above description of the BRIAN method 10, it is manifest that various techniques may be used for implementing the concepts of method 10 without departing from its scope. The described embodiments are to be considered in all respects as illustrative and not restrictive. It should also be understood that method 10 is not limited to the particular embodiments described herein, but is capable of many embodiments without departing from the scope of the claims.

I claim:

1. A method for creative machine-learning by analogy, the method comprising the following steps:

providing a network of component computer systems, each component comprises a plurality of sequential layers, each layer comprises a plurality of parallel segments, each segment comprises a processor and a memory store, each memory store is configured to store a domain-specific case base, wherein each case is defined by a situation-action pair;

stochastically transforming cases in each case base through automatic deterministic generalization and analogy when the corresponding processor is in a dream mode to create transformed cases, and selecting pairs of cases for generalization and analogy with a 3-2-1 skew during the transforming;

providing a user-entered situation, wherein the situations are sets of parametized natural language questions, and wherein each situation comprises a vertically-stacked, AND-operator-connected set of questions;

modifying the user-entered situation by expanding its contextual mnemonics;

searching each case base for cases and transformed cases that include contextual subsets of the modified, user-entered situation;

for a given case base, mapping the modified, user-entered situation to a matched action within the given case base, wherein the actions are sequences of parametized natural language statements, and wherein each action comprises a vertically-stacked sequence of action statements;

using the 3-2-1 skew to independently find candidate macro situations and macro actions from within the most-frequently-used (MFU) segments; and using the 3-2-1 skew to iteratively replace macros within each segment with a corresponding macro definition when found during dream mode;

creating a new case comprising the user-entered situation and the matched action, wherein the 3-2-1 skew moves newly acquired cases to a logical head of a case base and progressively and stochastically selects from the logical head until the 3-2-1 skew uniformly selects from the entire case base; and calculating a possibility for a fired action in a static domain by using the heuristic $$\left(1 - \frac{1}{csp+1}\right),$$

where csp represents the number of covered situational predicates.

2. The method of claim 1, further comprising mapping the modified, user-entered situation to a new action if no match can be found in a given case base.

3. The method of claim 1, wherein one of the situations comprises an illustration.

4. The method of claim 1, further comprising determining a sequence of applied transforms using a k-limited transformation such that the number of transformations in any derivation are limited by k so the method does not go into infinite cycles.

\* \* \* \* \*